US009120486B1

(12) United States Patent
Mallinger

(10) Patent No.: US 9,120,486 B1
(45) Date of Patent: Sep. 1, 2015

(54) VEHICLE LANE KEEPING TECHNIQUES

(71) Applicant: Philip Mallinger, Shelby Township, MI (US)

(72) Inventor: Philip Mallinger, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/258,727

(22) Filed: Apr. 22, 2014

(51) Int. Cl.
*G01C 23/00* (2006.01)
*B60W 30/12* (2006.01)

(52) U.S. Cl.
CPC ..................................... *B60W 30/12* (2013.01)

(58) Field of Classification Search
CPC .............................. B60W 30/10; B60W 30/12
See application file for complete search history.

(56) References Cited

U.S. PATENT DOCUMENTS

| 8,452,535 | B2 | 5/2013 | Zeng et al. |
| 2004/0016870 | A1* | 1/2004 | Pawlicki et al. ........... 250/208.1 |
| 2010/0238283 | A1* | 9/2010 | Kim ............................... 348/135 |
| 2011/0022317 | A1 | 1/2011 | Okita |
| 2012/0226392 | A1 | 9/2012 | Kataoka |
| 2013/0208945 | A1 | 8/2013 | Nunn et al. |

* cited by examiner

*Primary Examiner* — Michael D Lang
(74) *Attorney, Agent, or Firm* — Ralph E Smith

(57) ABSTRACT

A computer-implemented method includes receiving, at a controller of a vehicle, the controller having one or more processors, image data of a road in front of and along which the vehicle is traveling, the road having a plurality of lane lines defining at least one lane. The method includes detecting a pair of the lane lines using the image data. The method includes determining that one of the pair of lane lines is an invalid lane line for defining a lane in which the vehicle is traveling. The method includes generating a virtual lane line based on previous image data in response to determining the invalid lane line, the virtual lane line being configured to replace the invalid lane line. The method also includes controlling lane keeping of the vehicle using the virtual lane line and the other lane line of the pair of lane lines.

13 Claims, 10 Drawing Sheets

VEHICLE LANE KEEPING TECHNIQUES

FIELD

The present disclosure relates generally to vehicle systems and, more particularly, to vehicle lane keeping techniques.

BACKGROUND

With initial reference to FIG. 1, a vehicle 100 having a conventional lane keeping system is shown traveling in a direction 104 along a road 108. The road 108 includes a plurality of lane lines 112a, 112b, and 112c (collectively "lane lines 112"). The lane lines 112 are solid or dashed lines depending on a configuration of the road 108. Lane lines 112a and 112b define lane 116a in which the vehicle 100 is traveling. Similarly, lane lines 112b and 112c define another lane 116b. The lane keeping system of the vehicle 100 captures image data corresponding to an image area 120 in front of the vehicle 100. Using this image data, the lane keeping system operates a steering assist system of the vehicle 100 to keep the vehicle 100 traveling along a desired path 124, e.g., a center of the lane 116a.

Conventional lane keeping systems, however, are ineffective in certain scenarios. In FIGS. 2A and 2B, the road 108 is a highway or an expressway. FIG. 2A illustrates an entrance/on-ramp lane 200 to the road 108. The entrance/on-ramp lane 200 is defined by inner and outer lane lines 204a and 204b, respectively. In this scenario, the lane keeping system incorrectly detects the outer lane line 204b of the entrance/on-ramp lane 200 in image area 208 as one of two lane lines to be used for lane keeping. The lane keeping system then operates the steering assist system to keep the vehicle 100 traveling along a path 212 that does not correspond to the center of the lane 116a and thus could cause the vehicle 100 to veer out of the lane 116a and/or off the road 108.

Similarly, FIG. 2B illustrates an exit/off-ramp lane 220 from the road 108. The exit/off-ramp lane 220 is defined by inner and outer lane lines 224a and 224b, respectively. In this scenario, the lane keeping system incorrectly detects the outer lane line 224b of the exit/off-ramp lane 220 in image area 228 as one of two lane lines to be used for lane keeping. The lane keeping system then operates the steering assist system to keep the vehicle 100 traveling along a path 232 that does not correspond to the center of the lane 116a and thus could cause the vehicle 100 to veer out of the lane 116a and/or off the road 108.

FIGS. 2C and 2D illustrate turn lane and intersection scenarios, respectively. In FIG. 2C, a turn lane 240 is defined by lane lines 244a and 244b, along with initial lane line 112a. In this scenario, the lane keeping system incorrectly detects lane line 244b of the turn lane 240 in image area 248 as one of the two lane lines to be used for lane keeping. The lane keeping system then operates the steering assist system to keep the vehicle 100 traveling along a path 252 that does not correspond to the center of the lane 116a and thus could cause the vehicle 100 to veer out of the lane 116a and/or off the road 108.

In FIG. 2D, on the other hand, an intersecting lane 260 is defined by inner and outer lane lines 264a and 264b, respectively. In this scenario, the lane keeping system incorrectly detects lane line 264b of the intersecting lane 260 in image area 268 as one of the two lanes to be used for lane keeping. The lane keeping system then operates the steering assist system to keep the vehicle 100 traveling along a path 272 that does not correspond to the center of the lane 116a and thus could cause the vehicle 100 to veer out of the lane 116a and/or off the road 108.

Thus, while such lane keeping systems work for their intended purpose, there remains a need for improvement in the relevant art.

SUMMARY

In one aspect, a computer-implemented method is provided in accordance with the teachings of the present disclosure. In an exemplary implementation, the method comprises: receiving, at a controller of a vehicle, the controller having one or more processors, image data of a road in front of and along which the vehicle is traveling, the road having a plurality of lane lines defining at least one lane; detecting, at the controller, a pair of the lane lines using the image data; determining, at the controller, that one of the pair of lane lines is an invalid lane line for defining a lane in which the vehicle is traveling; generating, at the controller, a virtual lane line based on previous image data in response to determining the invalid lane line, the virtual lane line being configured to replace the invalid lane line; and controlling, by the controller, lane keeping of the vehicle using the virtual lane line and the other lane line of the pair of lane lines.

In some implementations, the method further comprises: receiving, at the controller, subsequent image data of the road, the subsequent image data being captured after the image data; detecting, at the controller, a subsequent pair of the lane lines using the subsequent image data; determining, at the controller, that both of the subsequent pair of lane lines are valid lane lines for defining the lane in which the vehicle is traveling; and controlling, by the controller, lane keeping of the vehicle using the subsequent lane lines.

In some implementations, determining validity of a specific pair of lane lines further includes: determining, at the controller, a degree of parallelism between the specific pair of lane lines; and detecting, at the controller, that one of the specific pair of lane lines is invalid when the degree of parallelism is less than a predetermined threshold. In some implementations, the degree of parallelism is based on a similarity of curvatures of each of the specific pair of lane lines. In some implementations, the degree of parallelism is based on a similarity of angles between a center of the lane and each of the specific pair of lane lines.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As explained above, there remains a need for improvement in the art of lane keeping systems. The term "lane keeping" as used herein also refers to "lane centering," "lane guidance," "steering assist," and other suitable names for the technique of maintaining the vehicle along a desired path based on sensory feedback. Some lane keeping systems could generate/project a virtual lane line in scenarios where only one lane line is detected. Because these lane keeping systems could still detect the various invalid lane lines described above with respect to FIGS. 2A-2D, however, these lane keeping systems would still suffer from the same or similar deficiencies in these scenarios.

Accordingly, techniques for lane keeping using invalid lane detection and virtual lane projection are presented. In one exemplary implementation, these techniques include detecting a pair of lane lines based on image data for an area in front of a vehicle. The techniques determine whether one of the pair of lane lines is invalid for defining a lane in which the vehicle is traveling. For example only, the lane line could be an outer lane of a highway/expressway entrance/on-ramp or exit/off-ramp or could correspond to a turn lane or an intersection.

Examples of this determination include parallelism between the pair of lane lines, such as curvature and/or angle with respect to each other. When the invalid lane line is detected, the techniques generate a virtual lane line based on previous image data. In other words, the virtual lane line represents an extension of a previous valid lane line. The techniques then perform lane keeping using virtual lane line and the other (valid) lane line. When a pair of valid lane lines is detected, the techniques revert to lane keeping using the pair of valid lane lines.

Figure 1:
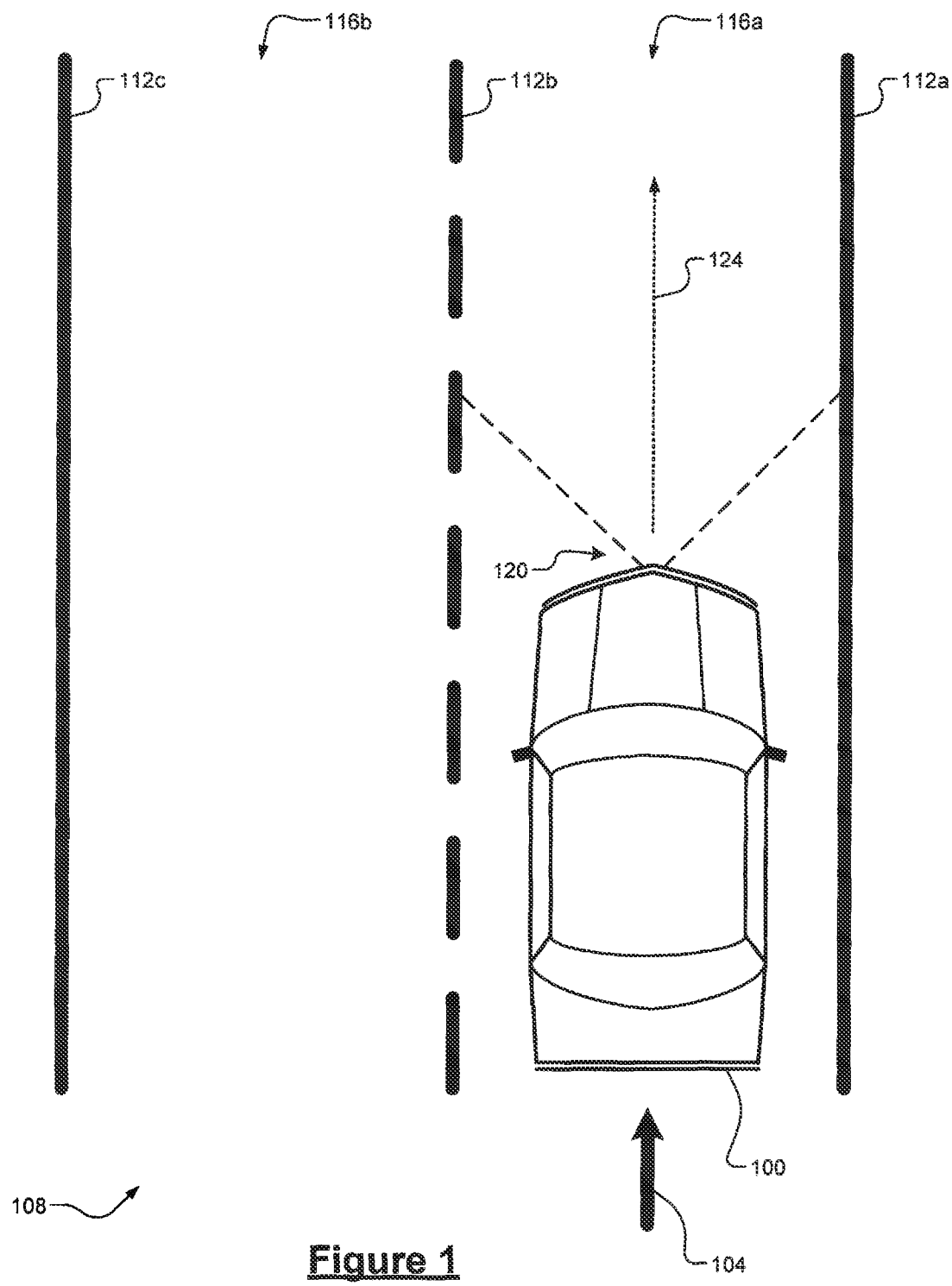
FIG. 1 is an example illustration of a vehicle performing lane centering/guidance according to the prior art.
Figure 2A:
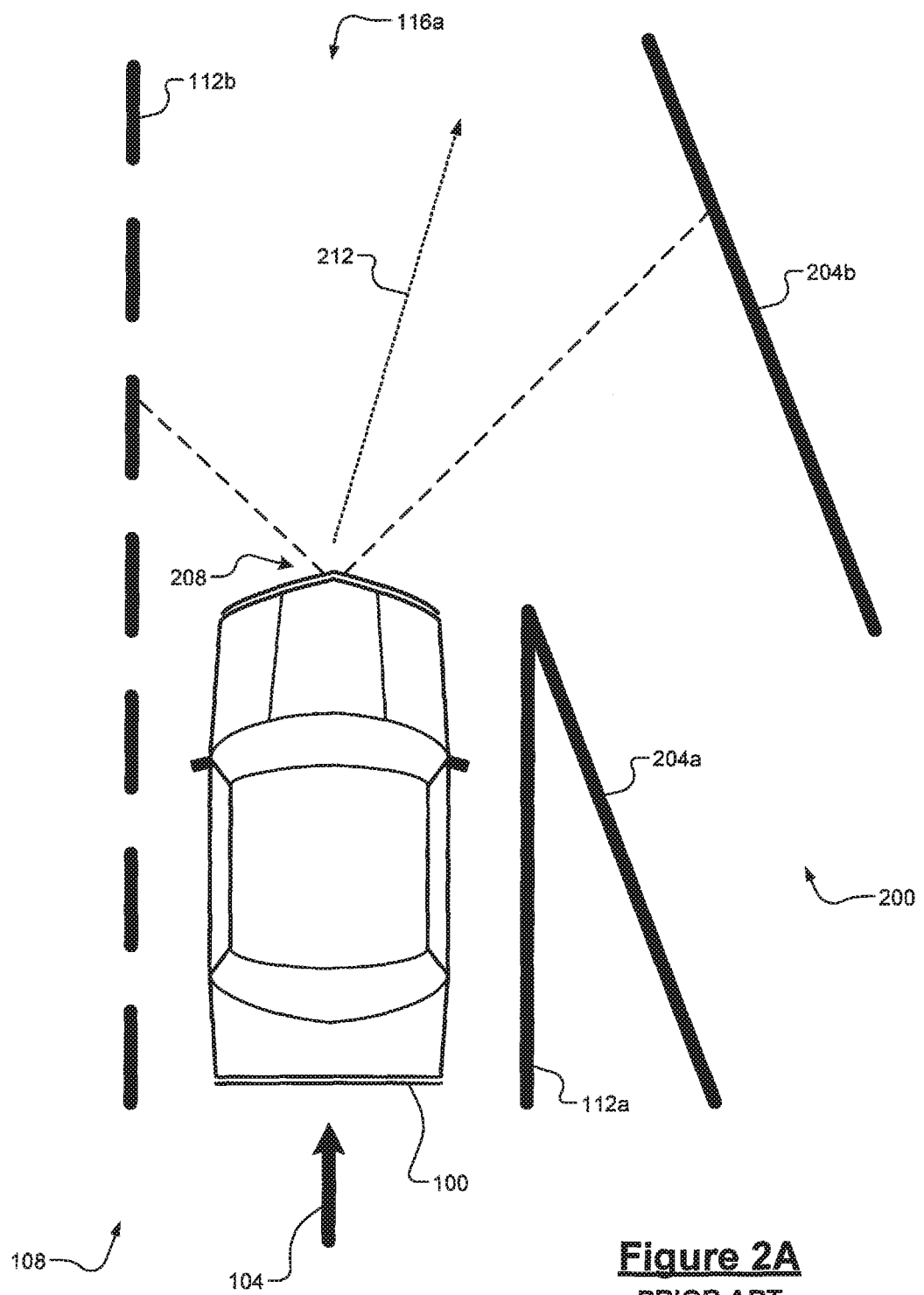
FIGS. 2A-2D are example illustrations of failure scenarios of lane centering/guidance performed by vehicles according to the prior art.
Figure 2B:
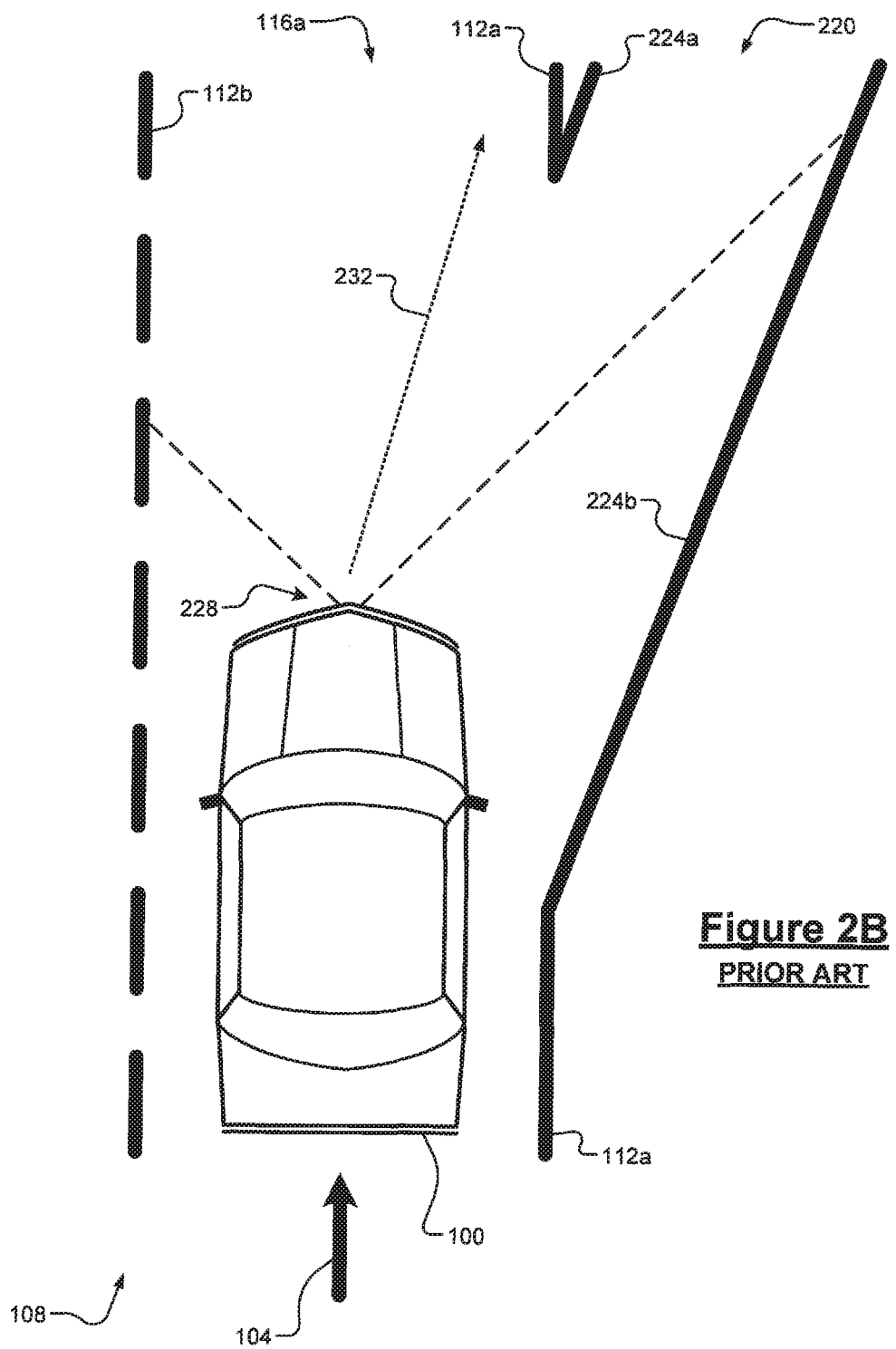
Figure 2C:
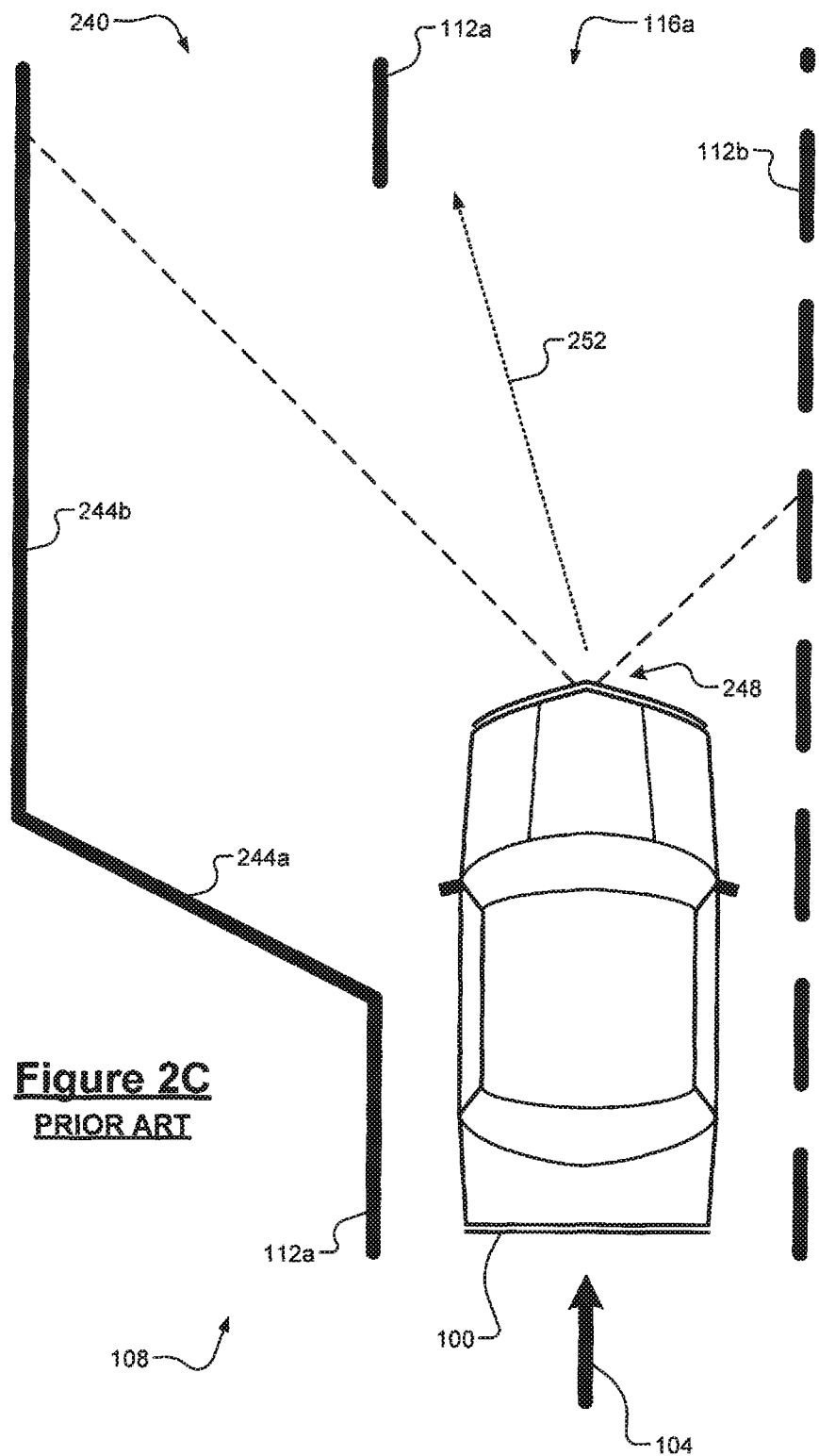
Figure 2D:
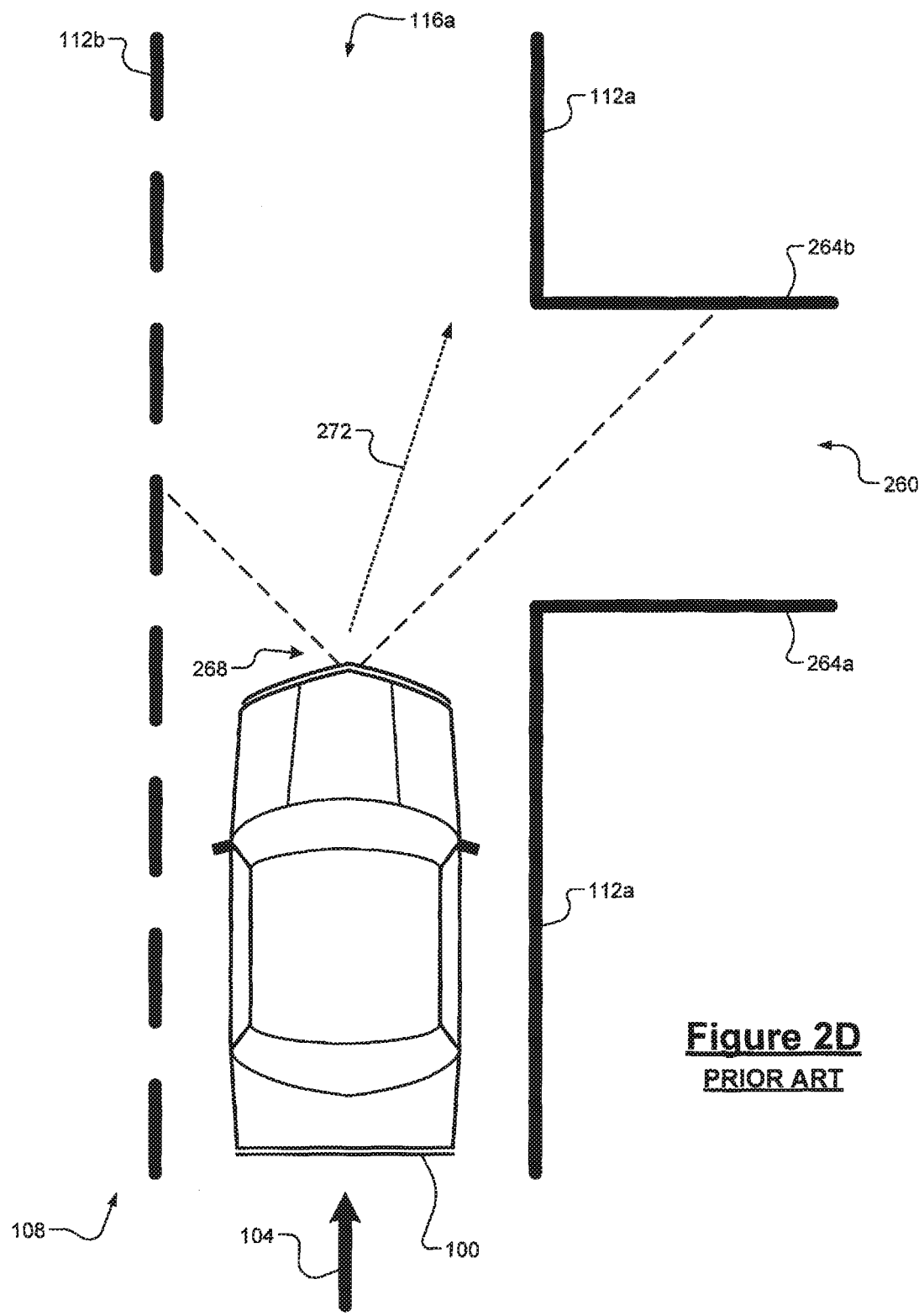
Figure 3:
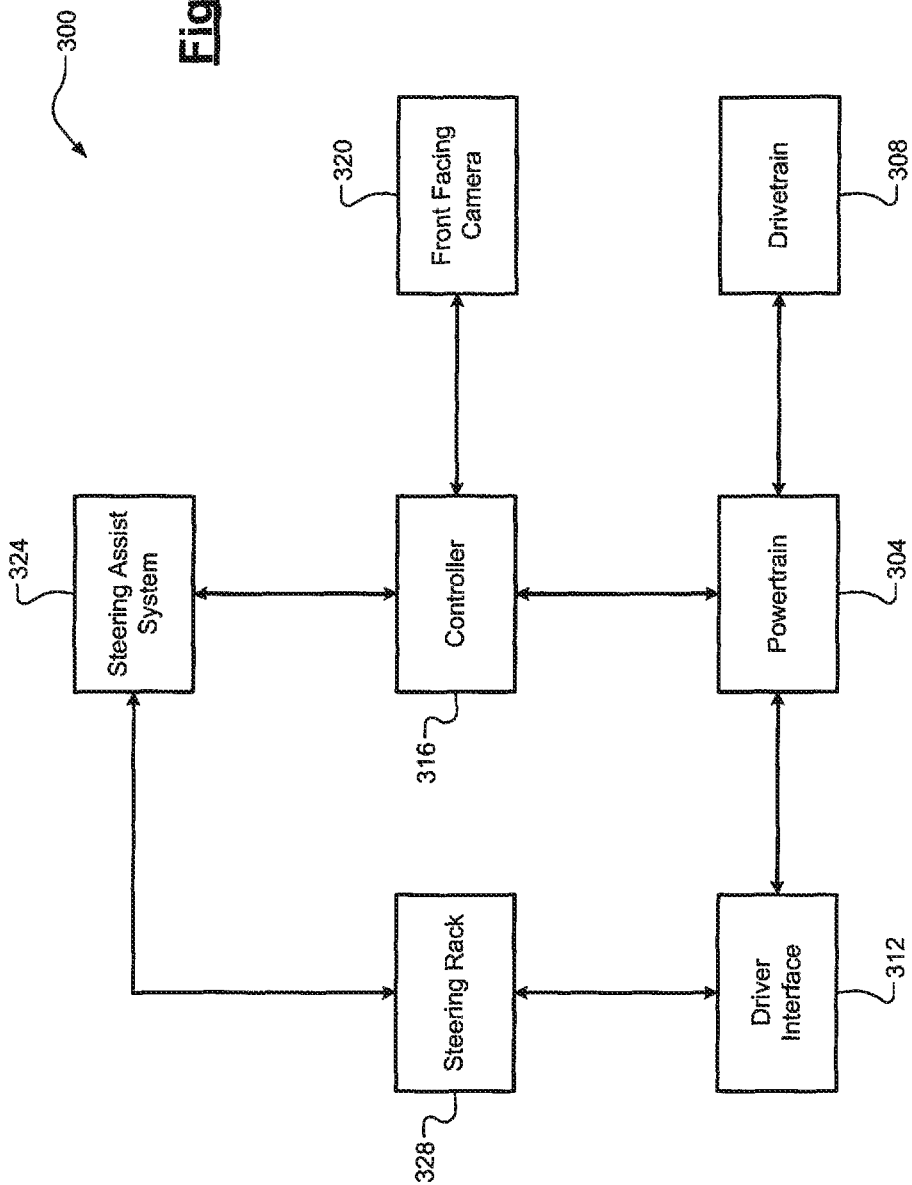
FIG. 3 is an example functional block diagram of a vehicle according to the principles of the present disclosure.

Referring now to FIG. 3, an example functional block diagram of a vehicle 300 is illustrated. The vehicle 300 includes a powertrain 304 (an engine, an electric motor, etc.) that generates drive torque for a drivetrain 308 (one or more wheels, a drivetrain, etc.). A driver of the vehicle 300 provides input via a driver interface 312, e.g., an accelerator pedal. A controller 316 controls operation of the powertrain 304 such that the powertrain 304 generates a desired torque corresponding to the driver input. The vehicle 300 further includes a front-facing camera 320 and a steering assist system 324. In one exemplary implementation, the front facing camera 320 is mounted at a top edge of and behind a windshield of the vehicle 300. It will be appreciated, however, that the front facing camera 320 could be mounted in any suitable location for capturing image data in front of the vehicle 300.

In one exemplary implementation, these components are part of a lane keeping system of the vehicle 300. The front-facing camera 320 captures image data of an area in front of the vehicle 300. Examples of the front-facing camera 320 include charge-coupled device (CCD) cameras and complimentary metal-oxide-semiconductor (CMOS) cameras. In some implementations, the front-facing camera 320 continuously or periodically captures image data, and previous/prior/past image data is stored at the controller 316. The steering assist system 324 adjusts operation of a steering rack or a steering rack and pinion system 328 to adjust steering of the vehicle 300. The driver interface 312 could also include a steering wheel or other device that allows a driver of the vehicle 300 to control the steering rack 328.

Figure 4:
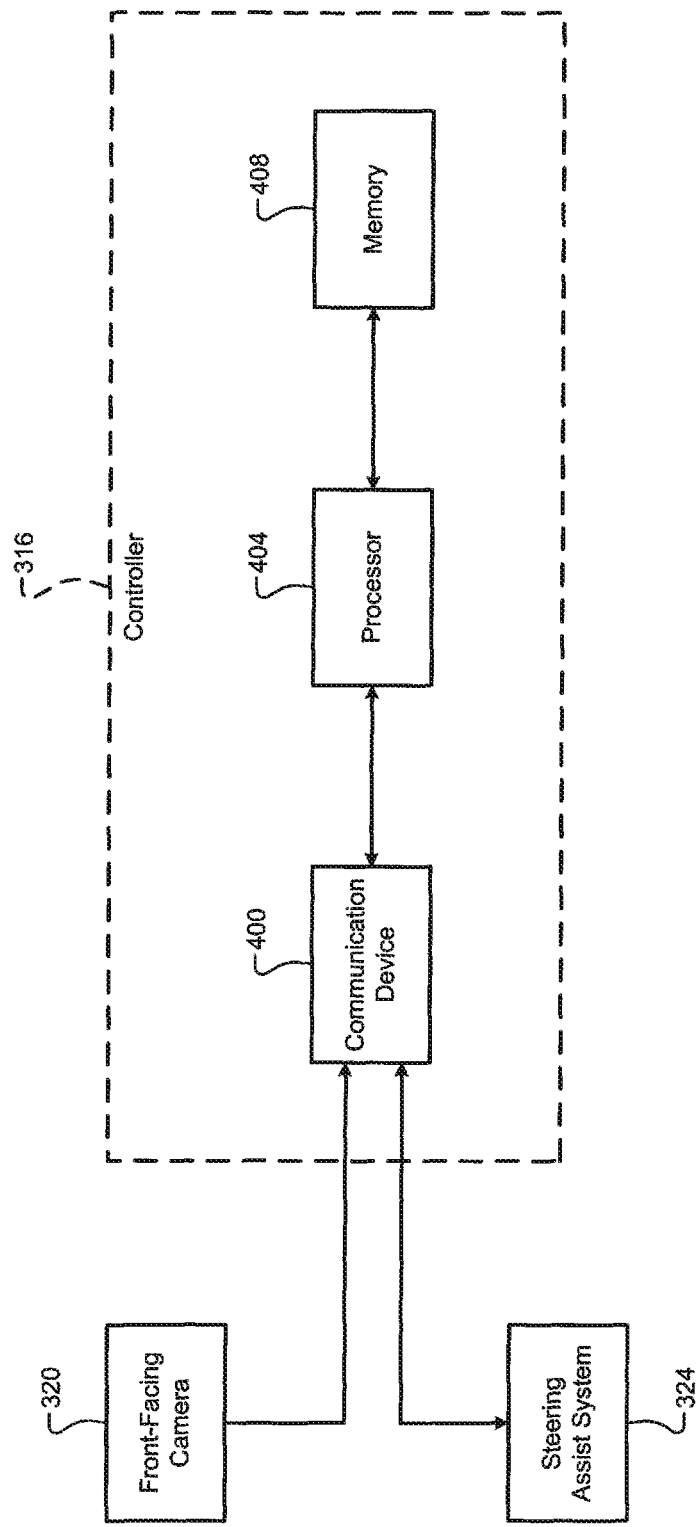
FIG. 4 is an example functional block diagram of a controller according to the principles of the present disclosure.

Referring now to FIG. 4, an example functional block diagram of the controller 316 is illustrated. The controller 316 includes a communication device 400, a processor 404, and a memory 408. The communication device 400 is configured to communicate with other components of the vehicle 300 via a controller area network. The processor 404 is configured to execute at least a portion of the techniques of the present disclosure, which are described in greater detail herein. It should be appreciated that the term "processor" as used herein refers to both a single processor and two or more processors operating in a parallel or distributed architecture. The memory 408 is any suitable storage medium (flash, hard disk, etc.) configured to store information at the controller 316.

Figure 5A:
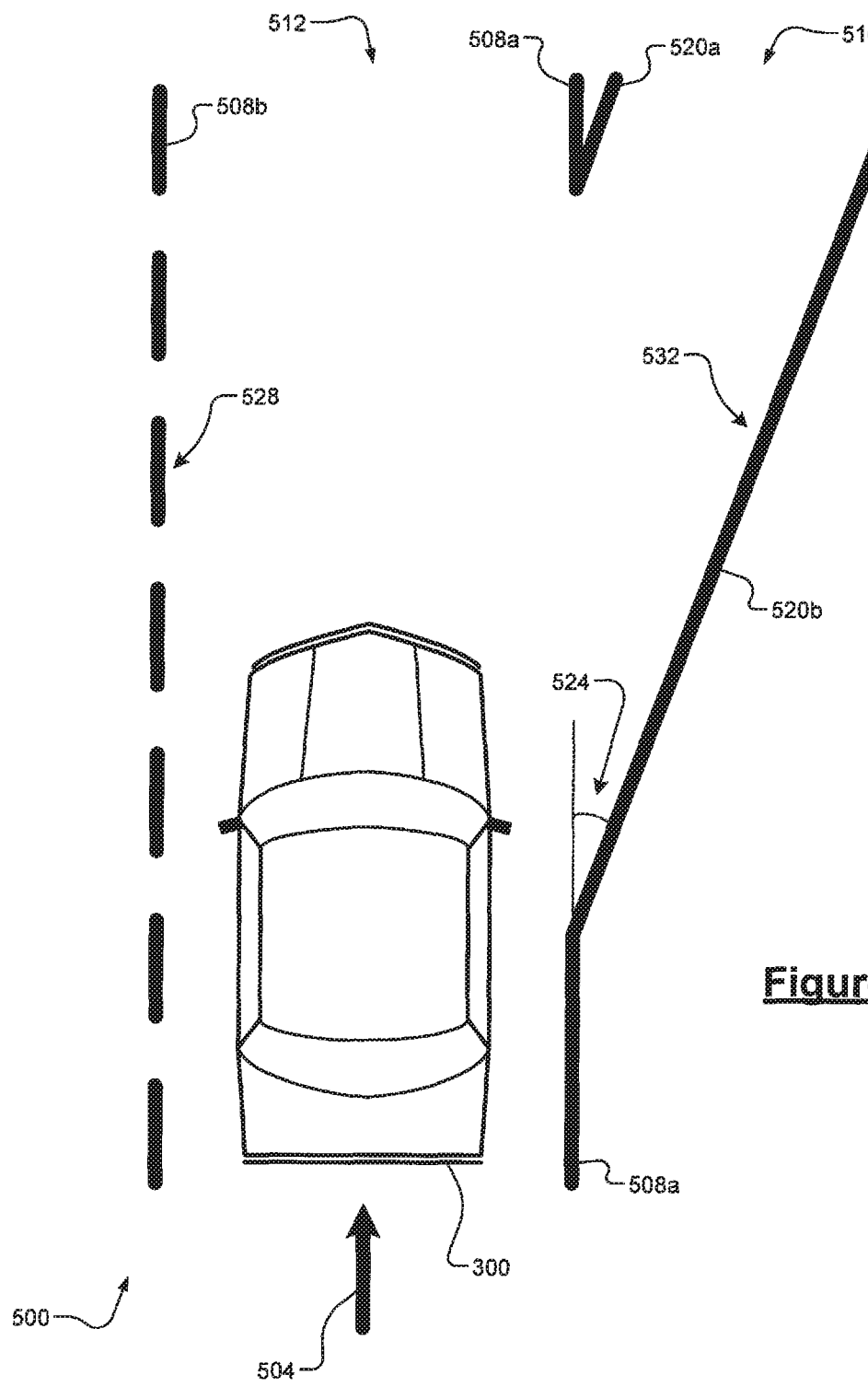
FIGS. 5A-5B are example illustrations of invalid lane detection and virtual lane projection according to the principles of the present disclosure.
Figure 5B:
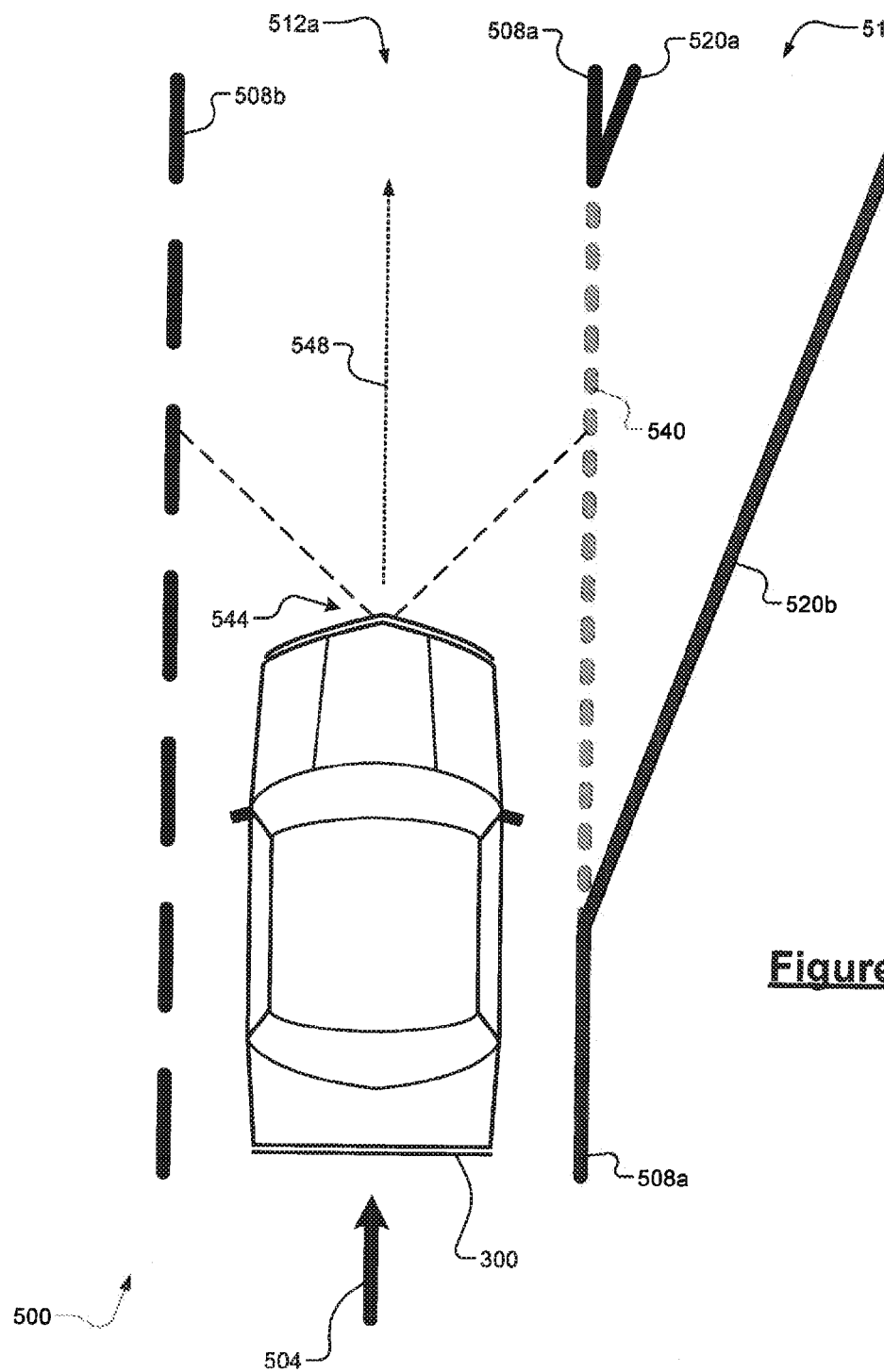

Referring now to FIGS. 5A-5B, invalid lane detection and virtual lane generation/projection according to the techniques of the present disclosure are illustrated. In FIG. 5A, the vehicle 300 is traveling along a road 500 in a direction 504 between lane lines 508a and 508b (collectively "lane lines 508") that define a lane 512a. The road 500 further includes an exit/off-ramp lane 516 defined by inner and outer lane lines 520a and 520b, respectively. As previously described herein and with specific reference to FIG. 26, the outer lane line 520b of the exit/off-ramp lane 516 could be detected by the controller 316 using the front-facing camera 320 to be one of a pair of lane lines.

In response, the controller 316 determines whether the outer lane line 520b is invalid for defining the lane 512a in which the vehicle 300 is traveling. In one exemplary implementation, the controller 316 determines and compares an angle 524 between the outer lane line 520b and the valid lane line 508b. Alternatively, this angle 524 could be an angle between the previous/prior lane line 508a and the outer lane line 520b as shown. When the angle 524 is greater than a predetermined angle threshold, the controller 316 determines that the outer lane line 520 is an invalid lane line. The predetermined angle threshold also represents a maximum acceptable angle for detecting a valid lane line. In other words, the controller 316 could determine a change in the angle from the previous/prior valid lane line 508a to the outer lane line 520b.

It will be appreciated that any suitable determination of a degree of parallelism between the valid lane line 508b and the outer lane line 520b could be used in determining the validity of the outer lane line 520b. In this manner, lane line validity is performable for non-linear lane lines, such as curves and bends on the road 500. For example only, the controller 316 could determine and compare a curvature 528 of the valid lane line 508b and a curvature 532 of the outer lane line 520b and, when the difference in curvature is greater than a corresponding threshold, the controller 316 could determine that the outer lane line 520 is an invalid lane line. It will also be appreciated that global positioning satellite (GPS) data could be used to supplement or augment the lane validity determination. GPS systems, for example, possess extensive information regarding entrance/on-ramps, exit/off-ramps, intersections, and turn lanes for precise navigation purposes, and thus would be suitable to augment the invalid lane detection and/or virtual lane projection techniques of the present disclosure.

Referring now to FIG. 5B, when the outer lane line 520b is determined to be invalid, the controller 316 generates and projects a virtual lane line 540 in place of the outer lane line 520b. The controller 316 generates the virtual lane line 540 based on previous/prior image data corresponding to lane line 508a. In other words, the controller 316 extends lane line 508a in generating the virtual lane line 540. The controller 316 then uses the valid lane line 508b and the virtual lane line 540 to perform lane keeping. As shown, image data 544 is used to detect the valid lane line 508b and the virtual lane line 540 is used until valid lane line 508a is detected again. In this manner, lane keeping is able to be performed along a desired path 548 down a center of the lane 512a.

Figure 6:
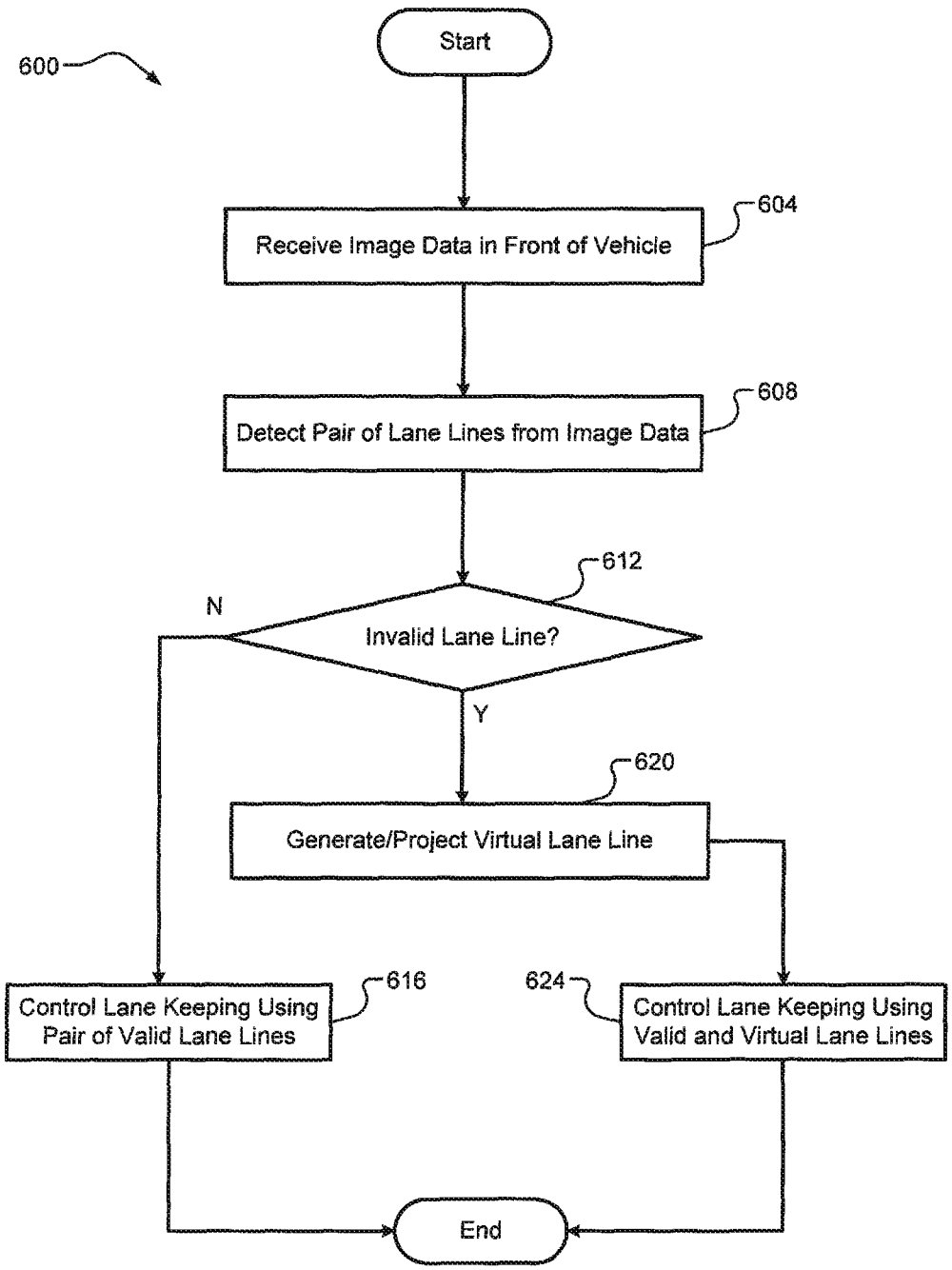
FIG. 6 is an example flow diagram of a method of lane keeping according to the principles of the present disclosure.

Referring now to FIG. 6, an example flow diagram of a method 600 for lane keeping is illustrated. At 604, the controller 316 receives image data of the road in front of and along which the vehicle 300 is traveling, the road having a plurality of lane lines defining at least one lane. At 608, the control 316 detects a pair of the lane lines using the image data. At 312, the controller 316 determines whether both of the pair of lane lines are valid for defining a lane in which the vehicle 300 is traveling. In other words, the controller 316 determines or detects that one of the pair of lane lines is an invalid lane line for defining the lane in which the vehicle 300 is traveling. In one exemplary implementation, lane line validity is determined based on a degree of parallelism between the lane lines.

If both of the pair of lane lines are valid, the method 600 proceeds to 616. If one of the pair of lane lines is invalid, the method 600 proceeds to 620. At 616, the controller 316 controls lane keeping of the vehicle 300 using the pair of valid lane lines. The method 600 then ends or returns to 604 for one or more additional cycles. At 620, the controller 316 generates a virtual lane line based on previous image data, the virtual lane line being configured to replace the invalid lane line. At 624, the controller 316 controls lane keeping of the vehicle 300 using the virtual lane line and the valid lane line. The method 600 then ends or returns to 604 for one or more additional cycles.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer-implemented method, comprising:
   receiving, at a controller of a vehicle, the controller having one or more processors, image data of a road in front of and along which the vehicle is traveling, the road having a plurality of lane lines defining at least one lane;
   detecting, at the controller, a first pair of the lane lines using the image data;
   using the image data, detecting, at the controller:
     (i) a break in one of the first pair of lane lines, and
     (ii) after detecting the broken lane line, detecting a second pair of lane lines using the image data, the second pair of lane lines including the unbroken lane line from the first pair of lane lines and another different lane line;
   determining, at the controller, that one of the second pair of lane lines is an invalid lane line for defining a lane in which the vehicle is traveling;
   generating, at the controller, a virtual lane line based on previous image data in response to determining the invalid lane line, the virtual lane line being configured to replace the invalid lane line in the second pair of lane lines; and
   controlling, by the controller, lane keeping of the vehicle using the virtual lane line and the other lane line of the pair of lane lines.

2. The computer-implemented method of claim 1, further comprising:
   receiving, at the controller, subsequent image data of the road, the subsequent image data being captured after the image data;
   detecting, at the controller, a subsequent pair of the lane lines using the subsequent image data, the subsequent pair of lane lines corresponding to the first pair of lane lines;
   determining, at the controller, that both of the subsequent pair of lane lines are valid lane lines for defining the lane in which the vehicle is traveling; and
   controlling, by the controller, lane keeping of the vehicle using the subsequent pair of lane lines.

3. The computer-implemented method of claim 2, wherein controlling lane keeping of the vehicle further includes adjusting, by the controller, operation of a steering assist system of the vehicle to keep the vehicle traveling between two specific lane lines.

4. The computer-implemented method of claim 2, wherein determining validity of a specific pair of lane lines further includes:
   determining, at the controller, a degree of parallelism between the specific pair of lane lines; and
   determining, at the controller, that one of the specific pair of lane lines is invalid when the degree of parallelism is less than a predetermined threshold.

5. The computer-implemented method of claim 4, wherein the degree of parallelism is based on a similarity of curvatures of each of the specific pair of lane lines.

6. The computer-implemented method of claim 5, wherein the degree of parallelism is based on a similarity of angles between a center of the lane and each of the specific pair of lane lines.

7. The computer-implemented method of claim 2, wherein determining of a specific pair of lane lines further includes:
   determining, at the controller, that one of the specific pair of lane lines is valid lane line for defining the lane in which the vehicle is traveling; and
   comparing, at the controller, the other lane line of the specific pair of lane lines to the valid lane line to determine a validity of the other lane line.

8. The computer-implemented method of claim 7, wherein determining the validity of the other lane line includes comparing at least one of:

(i) a curvature of the valid lane line and the other lane line; and (ii) an angle between the valid lane line and the other lane line.

9. The computer-implemented method of claim 2, wherein determining a validity of a specific lane line further includes:

determining, at the controller, an angle or a curvature of the specific lane line for the previous image data;

determining, at the controller, an angle or a curvature of the specific lane line for the image data; and determining, at the controller, that the specific lane line is invalid when a change in the angles or the curvatures is greater than a predetermined threshold.

10. The computer-implemented method of claim 1, further comprising utilizing, at the controller, global positioning satellite (GPS) data to augment the detection of the pair of lane lines and the selective determination of the invalid lane line.

11. The computer-implemented method of claim 1, wherein the road is a highway or expressway and the invalid lane line is an outer lane line of (i) an entrance/on-ramp or (ii) an exit/off-ramp.

12. The computer-implemented method of claim 1, wherein the invalid lane line is an outer lane of a (i) turn lane or (ii) an intersection.

13. The computer-implemented method of claim 1, wherein the break of the broken lane line corresponds to one of (i) an on-ramp of a highway or expressway, (ii) an off-ramp of a highway or expressway, (iii) a turn lane, and (iv) an intersection.

\* \* \* \* \*